United States Patent
LaStella

(10) Patent No.: US 10,690,047 B1
(45) Date of Patent: Jun. 23, 2020

(54) METHOD AND APPARATUS FOR MAKING GRAPHENE

(71) Applicant: Joseph P. LaStella, Hamilton, MT (US)

(72) Inventor: Joseph P. LaStella, Hamilton, MT (US)

(*) Notice: Subject to any disclaimer, the term of this patent is extended or adjusted under 35 U.S.C. 154(b) by 86 days.

(21) Appl. No.: 16/027,351

(22) Filed: Jul. 4, 2018

Related U.S. Application Data

(60) Provisional application No. 62/530,145, filed on Jul. 8, 2017.

(51) Int. Cl.
  *F02B 65/00* (2006.01)
  *C01B 32/184* (2017.01)
  *F02B 23/08* (2006.01)

(52) U.S. Cl.
  CPC .......... *F02B 65/00* (2013.01); *C01B 32/184* (2017.08); *F02B 23/08* (2013.01)

(58) Field of Classification Search
  CPC ........ F02B 65/00; F02B 23/08; C01B 32/184; C01B 32/198
  See application file for complete search history.

(56) References Cited

U.S. PATENT DOCUMENTS

| | | | |
|---|---|---|---|
| 8,420,042 B2* | 4/2013 | Dickinson | B82Y 30/00 423/445 B |
| 9,260,308 B2* | 2/2016 | Dickinson | C01F 5/02 |
| 9,440,857 B2* | 9/2016 | Sorensen | C01B 32/184 |
| 2015/0166348 A1* | 6/2015 | Ikenuma | H01G 11/50 429/231.95 |

* cited by examiner

*Primary Examiner* — Hung Q Nguyen
(74) *Attorney, Agent, or Firm* — John D. Carpenter

(57) ABSTRACT

An apparatus for making graphene for industry and research includes a modified, direct injection diesel engine having one or more cylinders and pistons, intake and exhaust valves; a system for delivering a controlled blend of acetylene and oxygen gas, coupled to the engine intake manifold; and a system for collecting graphene, coupled to the engine's exhaust manifold. The top of each piston is substantially, flat, except for a small divot, and the engine's fuel injector(s) are replaced by spark plugs, with the tip of each spark plug protruding slightly into the combustion chamber, opposite the divot. Separate electric servo motors are attached to the camshaft(s) and crankshaft, and electronically coupled to a computer or other CPU, allowing automated control of engine piston(s), valves, and other components, and automated production of graphene. A method of making graphene using the apparatus is also described.

13 Claims, 7 Drawing Sheets
(3 of 7 Drawing Sheet(s) Filed in Color)

Actual photo of direct injection diesel engine block and piston.

Direct Injection Diesel Engine Head

Actual graphene produced by the utilization of the method outlined in this invention.

METHOD AND APPARATUS FOR MAKING GRAPHENE

CROSS-REFERENCE TO RELATED APPLICATION

This application claims the benefit of U.S. provisional patent application No. 62/530,145, filed Jul. 8, 2017, the entire contents of which are incorporated herein by this reference.

FIELD OF THE INVENTION

The invention relates to methods and apparatus for producing graphene for industrial and research purposes.

BACKGROUND OF THE INVENTION

Graphene is an allotrope of carbon in which carbon atoms are densely packed in a hexagonal pattern as a two-dimensional monolayer. Because of its impressive physical properties, including high mechanical strength, high intrinsic carrier mobility at room temperature, high thermal conductivity, unique optical properties, etc., graphene has attracted considerable interest in the past several years. Potential applications include use in nanoelectronics, sensors, nanocomposites, supercapacitors, and hydrogen storage.

A number of methods have been devised for producing graphene, with varying degrees of success. Examples include exfoliation of monolayers from graphite—typically requiring multiple exfoliation steps—chemical methods, chemical vapor deposition, laser techniques, supersonic spray techniques, microwave oxidation, and other methodologies. A detonation process is described in U.S. Pat. No. 9,440,857. Production of graphite oxide using the Hummers' method, followed by chemical reduction to form graphene, is environmentally unfriendly, time-consuming, and expensive. Indeed, most production methodologies devised to date suffer from various disadvantages, including high cost, the need for expensive or even exotic equipment, the need for multiple steps and the use of hazardous reagents, unsuitability for commercial production, etc. What is needed are improved methods and apparatus for making graphene utilizing off-the shelf components requiring little modification while yielding low-defect graphene monolayers in commercial quantities.

SUMMARY OF THE INVENTION

According to one aspect of the invention, a modified direct injection diesel engine and standard acetylene and oxygen industrial torch set are utilized to make graphene. The diesel engine is modified inasmuch as the top of each piston is made substantially flat by filling in the piston bowl (except for a small divot, as described herein); the fuel injector is replaced with a spark plug or similar ignitor, the timing chain is removed; a separate servo motor is connected to each camshaft; and a separate servo motor is connected to the crankshaft. The servo motors provide precision control of the valves and pistons, as described herein in detail. A fuel and oxygen delivery system coupled to the modified engine allows a controlled mixture of acetylene and oxygen to be fed into the "detonation chamber"—the volume of space between the top of the piston and the bottom of the cylinder head—and detonated by energizing the spark plug, thereby producing graphene. A graphene collection system made of various off-the shelf components, such as a vacuum pump, cyclone, and electrostatic precipitator, is coupled to the engine downstream of the exhaust manifold to collect graphene. A central processing unit (e.g., computer or microprocessor) is electronically linked to the servo motors, fuel and oxygen delivery system, and other components to provide tight control over the fuel-to-oxygen ratio, pressure, position of the piston(s) within the cylinder(s), engine temperature, etc.

Advantageously, the apparatus and method described herein can be used for commercial, industrial-scale production of graphene, as well as for research purposes, including the investigation of graphene, fullerenes, nanotubes, and other carbon species. The apparatus is automated and simple to use, can be constructed at very little cost and with no adverse impact on the environment, and is designed to produce very high-quality graphene.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features and advantages of the invention will be understood more completely when considered in conjunction with the accompanying drawings (which are not necessarily drawn to scale), wherein.

DETAILED DESCRIPTION

Figure 1:
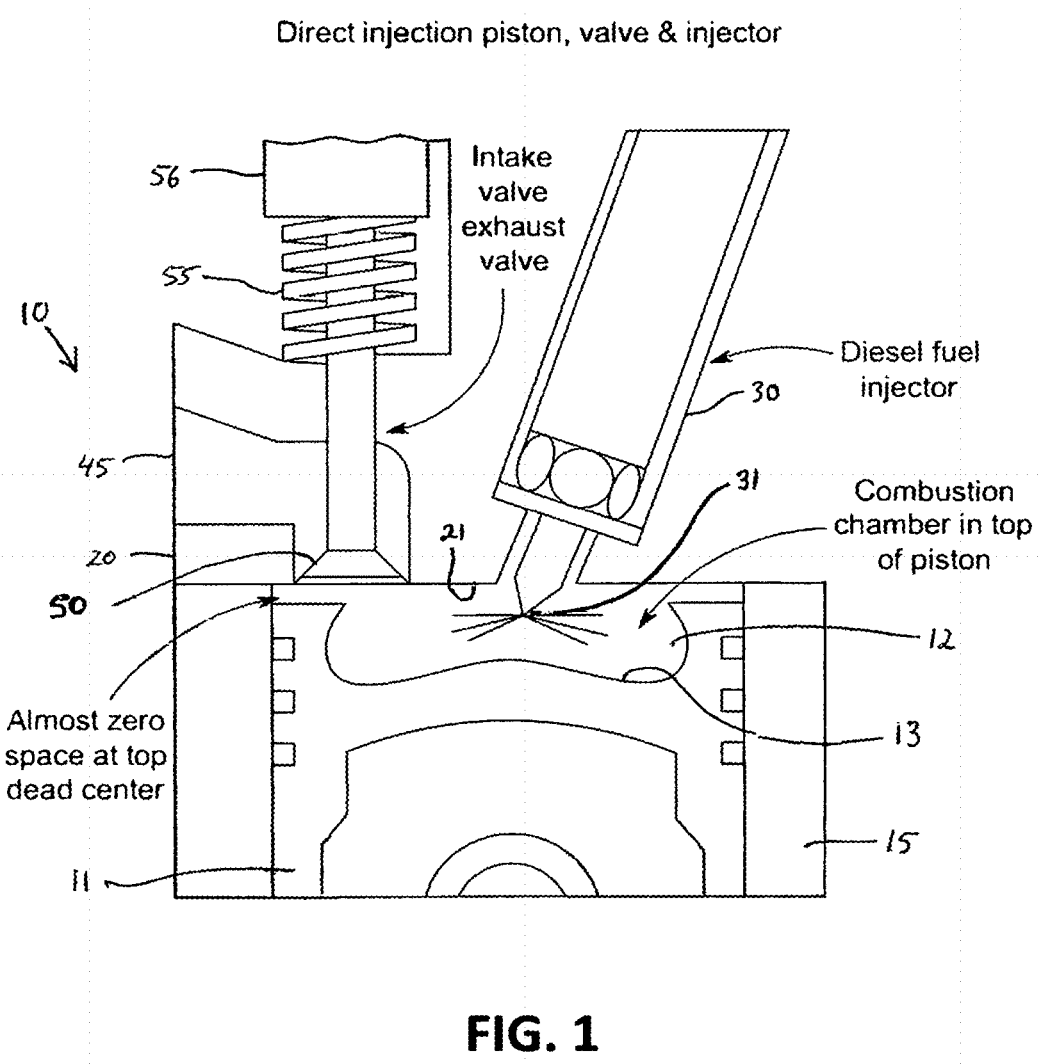
FIG. 1 is a schematic, cross-sectional view of a portion of a modern direct injection diesel engine.
Figure 2:
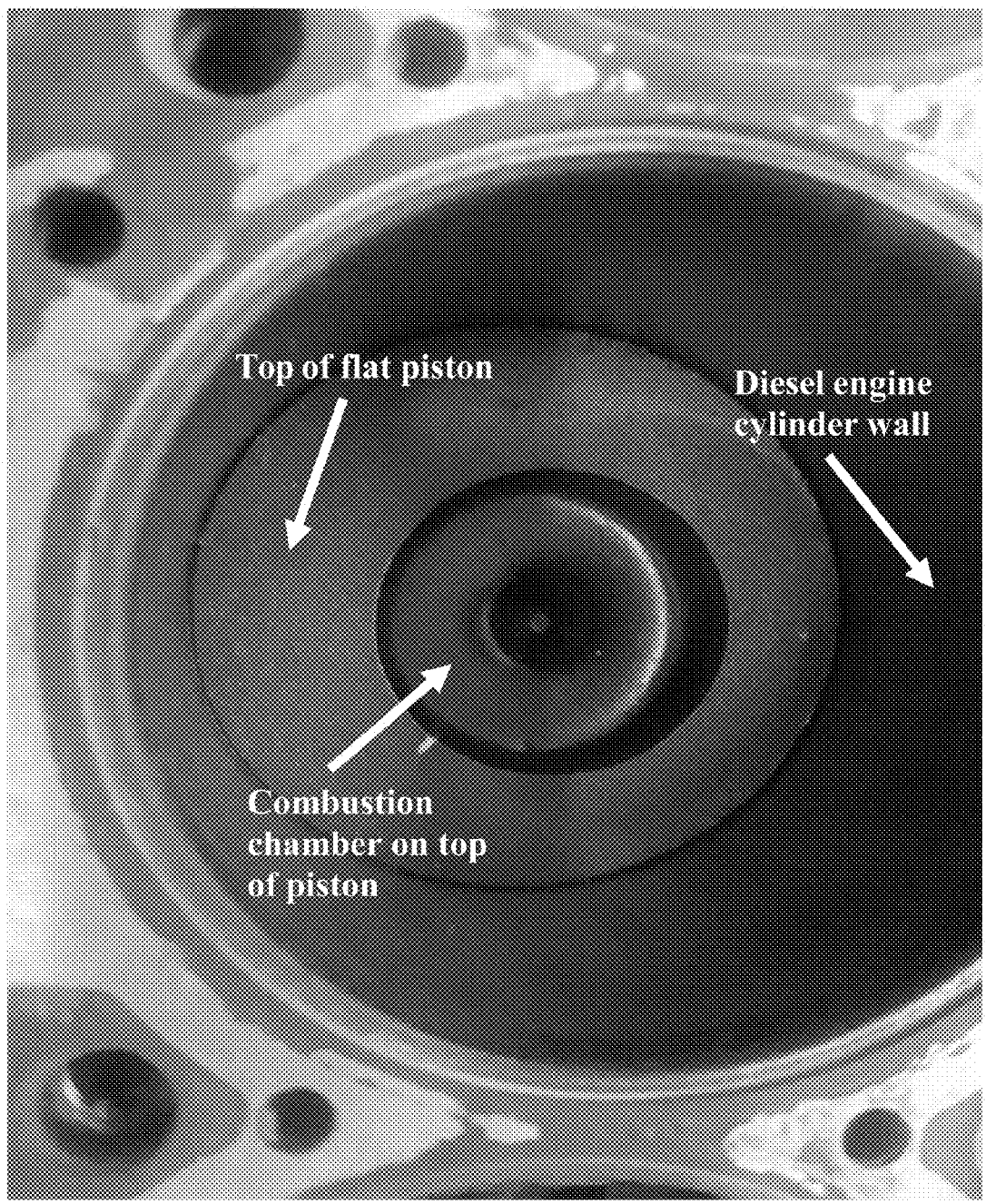
FIG. 2 is photograph of a direct injection diesel engine block and piston.

Referring now to FIG. 1, a portion of a modern, direct fuel injection diesel engine is schematically illustrated. The engine 10 includes one or more pistons 11, each seated in a cylinder 15, the cylinder(s) being located within a strong cylinder block (engine block). A cylinder head 20 sits above the piston(s) and covers the cylinder block, with the head and block being separated by a gasket or other seal (not shown). A bowl 12 is formed in the top of each piston 11. The combustion chamber of a modern direct injection diesel engine is located in the piston bowl and not in the head like a conventional gasoline engine or indirect injection diesel engine. More particularly, when the piston 11 is at or near top dead center in the cylinder, the combustion chamber is the small volume defined by the inner surface 13 of the piston bowl and the flat undersurface 21 of the cylinder head immediately above the piston bowl. FIG. 2 is a photograph of a modern direct injection diesel engine block and piston.

Figure 3:
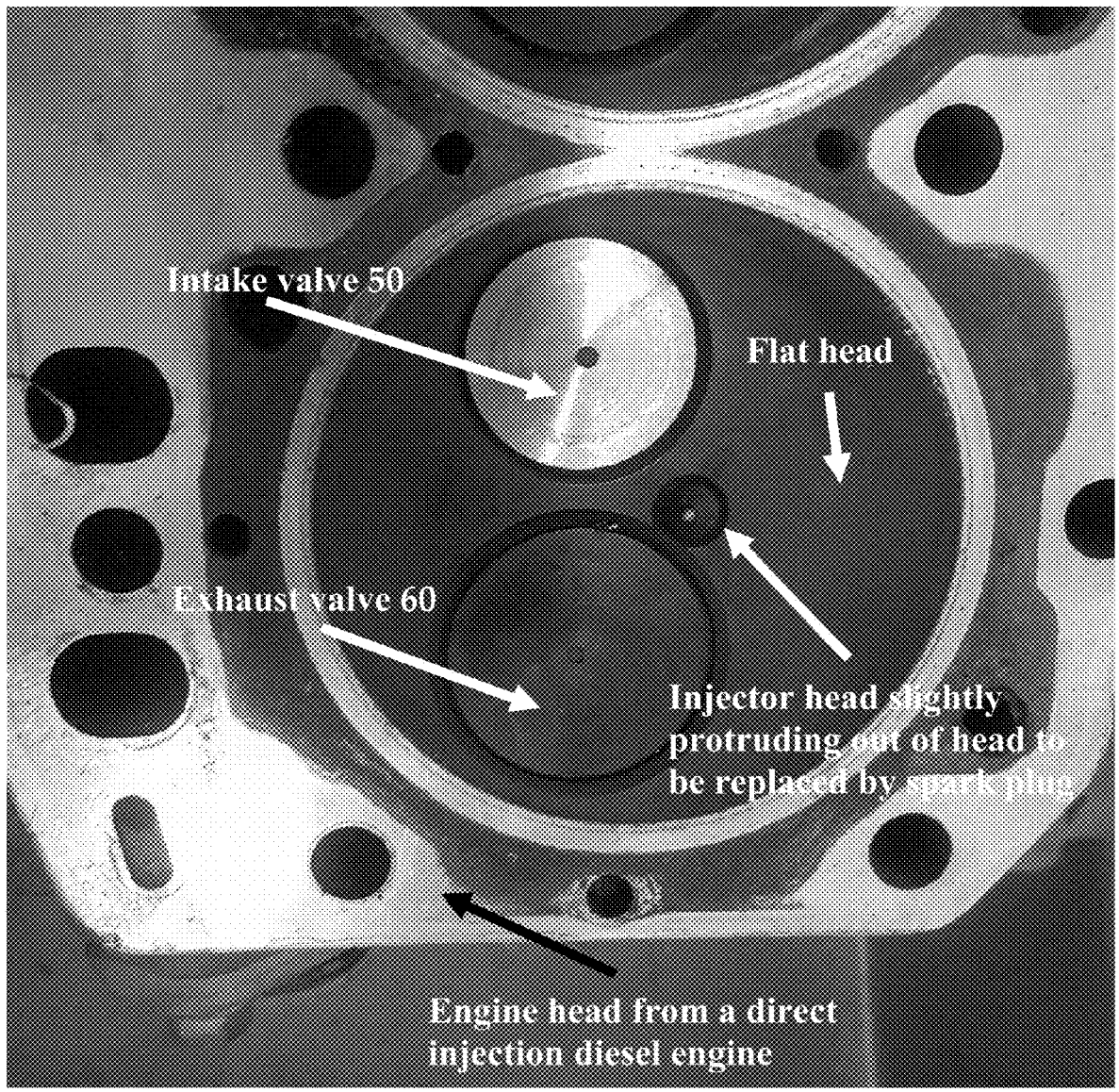
FIG. 3 is a photograph of a direct injection diesel engine head.

Referring again to FIG. 1, a diesel fuel injector 30 is secured within the cylinder head 20 with the nozzle tip 31 of the injector just protruding into the combustion chamber. An intake port 45 and intake valve 50 permit air to be introduced into the cylinder, while an exhaust port and exhaust valve facilitate the ejection of combustion gases from the combustion chamber and cylinder. Each valve is coupled to a spring 55 and tappet 56 which can engage a cam (not shown) on the camshaft (not shown) and facilitate opening and closing of the valve. In FIG. 1, a single intake/exhaust port and a valve are shown. More typically, there is a separate intake port and separate exhaust port for each cylinder, with a corresponding intake valve and exhaust valve, respectively. In some engines, there are two intake valves and two exhaust valves per cylinder, such as found in dual overhead cam (DOHC) engines. FIG. 3 is a photograph of a direct injection diesel engine head, with separate intake and exhaust valves 50, 60. If two or more cylinders are employed, the intake ports can be coupled upstream in a common intake manifold (not shown). Similarly, the exhaust ports can be coupled downstream in a common exhaust manifold (not shown).

It will be appreciated that the diesel engine has components other than those just described, including a fuel system, piston connecting rods or arms, a crankshaft, a crankcase containing oil, a cooling system, various electronics, etc.

Figure 4:
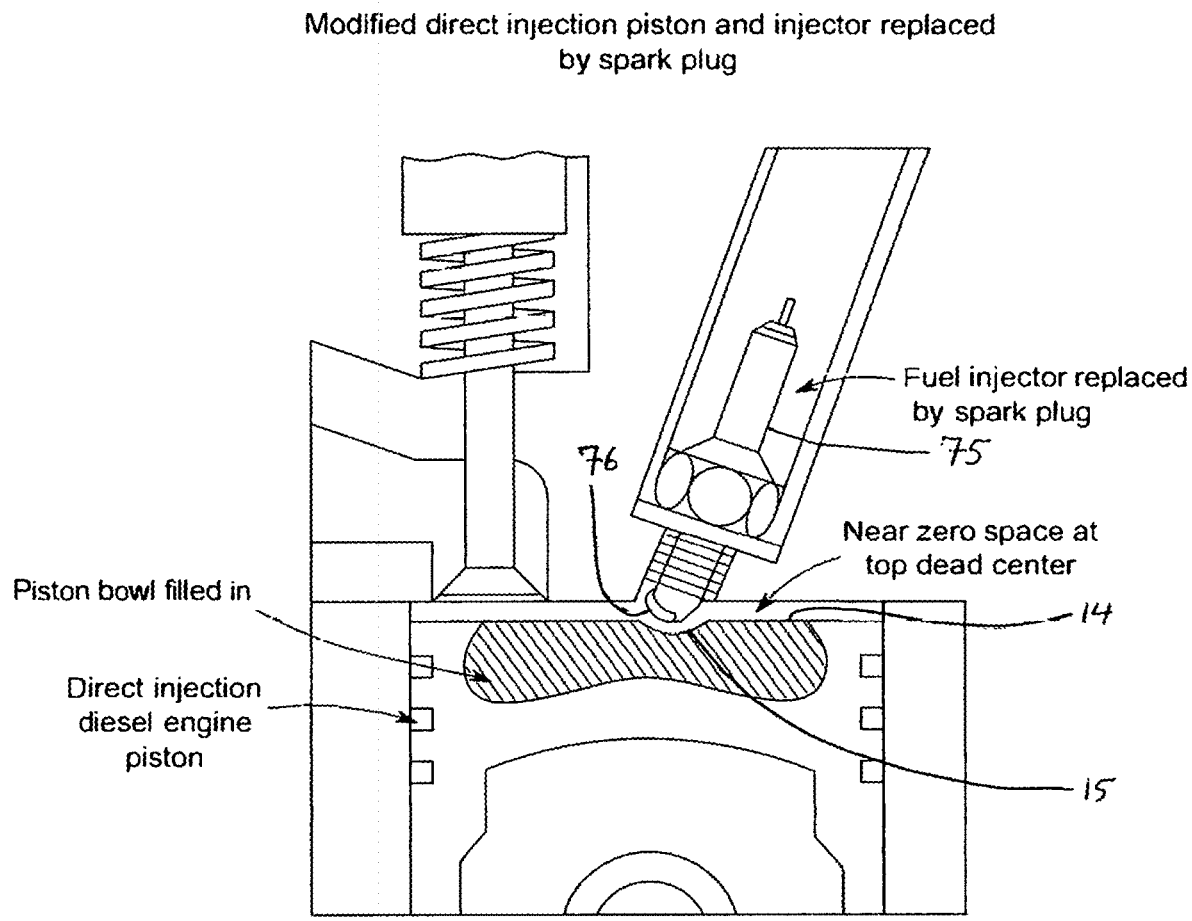
FIG. 4 is a schematic, cross-sectional view of a portion of a direct injection diesel engine modified according to one embodiment of the invention.

In a first aspect of the invention, a modern direct injection diesel engine such as depicted in FIGS. 1-3 is modified in several respects, as shown in FIG. 4. The fuel injector has been replaced by a spark plug 75 or similar ignitor. The spark plug is electrically coupled to a battery or other power supply. The piston bowl 12 has been filled in by welding material to the piston bowl, or with equivalent material. In one embodiment, a metal plug, of from 3/16 to 1/4 of an inch thick, having a diameter to fit the piston bowl is machined, fitted to the piston, welded in place, and ground smooth and flat, with additional polishing as desired. Consequently, the upper surface 14 of the top of the piston is made substantially flat. However, a very shallow divot 15, approximately 1/16$^{th}$ of an inch or less, is formed in the top surface of the filled-in piston, at a location directly below where the ground electrode 76 at the tip of the spark plug protrudes into the combustion chamber. As described below, the divot's placement directly opposite the tip of the spark plug—and the spark plug's slight protrusion into the chamber—facilitate self-cleaning of the spark plug.

These modifications convert the combustion chamber into a detonation chamber. When a carefully controlled mixture of acetylene and oxygen is fed into the detonation chamber, energizing the spark plug causes the acetylene-oxygen mixture to detonate and generating graphene. When the exhaust valve is opened and the piston raised to top dead center, the flat piston in conjunction with the flat head (see FIG. 4) ensures that the detonated gases will be completely expelled out of the detonation chamber, because the space at top dead center of the piston stroke in a direct injection diesel engine will leave close to zero space between the upper surface 14 of the piston and the undersurface 21 of the cylinder head. Indeed, the two parts—piston and cylinder head—may actually touch at top dead center, facilitating virtually complete evacuation of the combustion chamber. In one embodiment (described below), evacuation of the detonation chamber is enhanced by providing a vacuum system downstream from the engine exhaust manifold.

As noted earlier, in a conventional diesel engine, the camshaft(s) and crankshaft are linked together by a timing chain. With the invention, the timing chain is not needed and can be removed, along with any extraneous gears, collars, or related parts. Electric servo motors are then attached, with each camshaft and the crankshaft having its own dedicated servo motor. Each servo motor is paired with an encoder to provide position and speed feedback. In one embodiment, integrated servo motors are employed, each including a motor, encoder, and associated electronics in a single package. The servo motors allow for very precise control of the angular position of the camshaft(s) and crankshaft and, by extension, very precise control of the valves and pistons. Stepper motors can potentially be used as an alternative.

Figure 5:
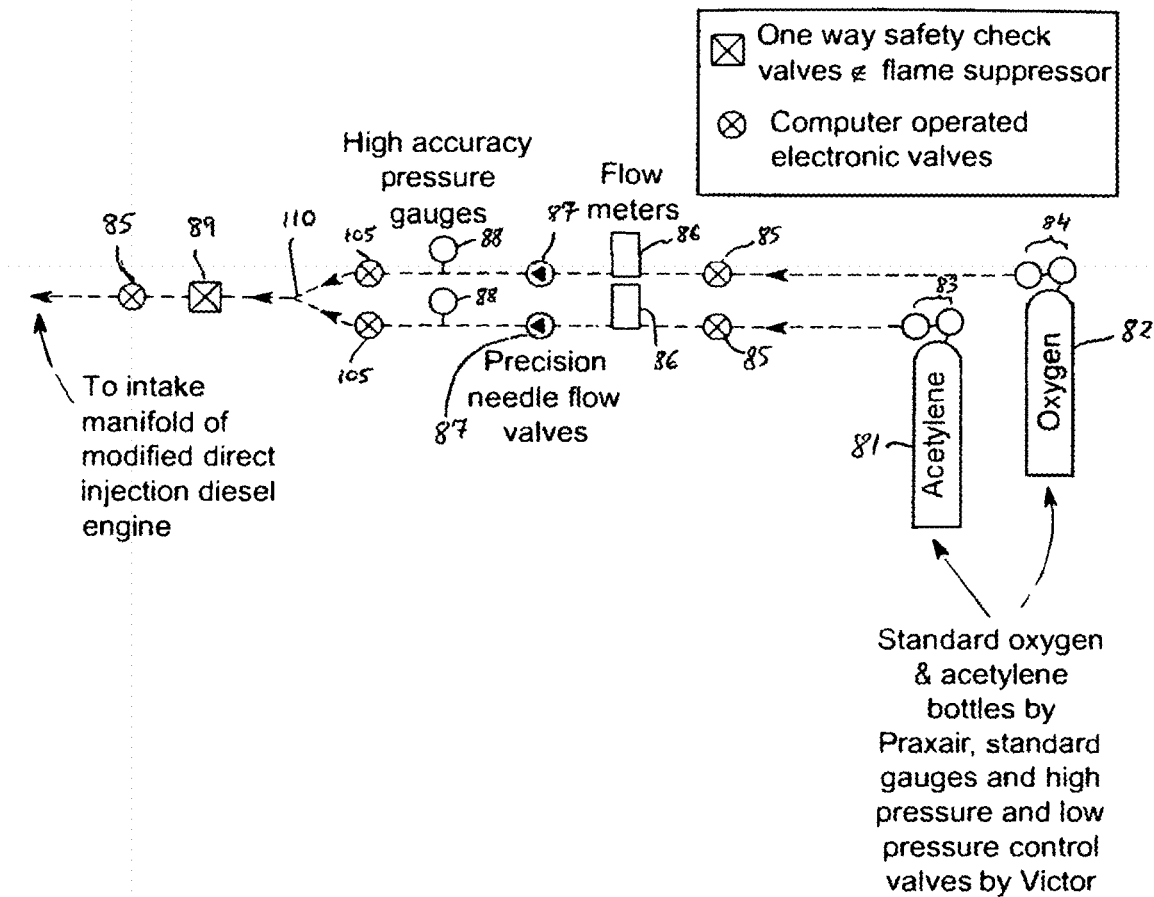
FIG. 5 is a schematic diagram of a system for delivering acetylene and oxygen to a modified direct injection diesel engine according to one embodiment of the invention.

FIG. 5 illustrates a delivery system for feeding a mixture of acetylene and oxygen into the modified diesel engine according to one embodiment of the invention. The gas delivery system includes an acetylene tank 81, oxygen tank 82, and their associated pressure regulators and gauges 83, 84; electronically controlled flow valves 85, flow meters 86, precision needle flow valves 87, high-accuracy pressure gauges 88, at least one one-way safety check valve and flame suppressor 89, and associated hoses suitable for transporting acetylene and oxygen. Servo valves and motors (not shown) can be used to control flow and gas concentration. Node 90 denotes where the acetylene and oxygen streams are brought together in a suitable stream coupler or other device. Once the two gases are brought together, passage through a sufficient length of hose ensures proper mixing, as a result of the low viscosity intrinsic to gasses. Optionally, the acetylene and oxygen blend can be passed through a static mixer (not shown) to ensure even more thorough mixing.

The precision needle valves, electronic valves, flow meters, and other components of the gas delivery system ensure that a mixture of oxygen and acetylene is delivered to the engine's intake manifold at a desired pressure—about 15 psig—and oxygen-to-acetylene molar ratio, typically 0.4:1 to 0.8:1.

Acetylene is highly flammable and intrinsically unstable, especially when it is pressurized, even when not mixed with oxygen. The literature states that an acetylene hose of only 1/4 in. in diameter and a length of 100 ft. has the potential to explode with the power of 20 sticks of dynamite. Intense heat or a shockwave can cause acetylene to decompose explosively if the absolute pressure of the gas exceeds about 200 kilopascals (29 psi). Most regulators and pressure gauges report gauge pressure, and the safe limit for acetylene is 101 kPa (gage), or 15 psig—about 1 atmosphere. Acetylene is supplied and stored dissolved in acetone or dimethylformamide in a gas cylinder with a porous filling. When working with acetylene, safety precautions must be taken, including proper grounding of all equipment, storing the cylinders in an upright position away from intense heat or open flame, and so forth.

It is known that detonating acetylene with oxygen at different molar ratios produces explosive pressures as high as 14 atmospheres after detonation. This is high, but if the detonation takes place in a modern diesel engine, not dangerous. A modern direct injection diesel engine compresses its charge (before combustion) to 22 atmospheres, and even higher if it's turbocharged. The pressures generated in a standard diesel engine after combustion are well over 180 atmospheres. Hence, using a modern diesel engine modified as described herein to detonate a mixture of acetylene and oxygen gives a robust safety margin of at least 12 to 1.

Acetylene can form explosive compounds with copper, brass, copper salts, mercury and mercury salts, silver and silver salts, and nitric acid. All of the above should not be used in the components described herein, especially in any of the piping materials used in the gas delivery system. Back pressure valves on the gas delivery system (i.e., fuel, oxygen, air, vacuum, and exhaust valves) are not sufficient per se to prevent violent back flames. Each of the lines should be supplied with a combination flame arrester and blowback valve on both ends of the line, especially the oxygen and acetylene supply lines. All other forms of safety equipment that are normally required by the industry should also be incorporated, i.e., gas leak detectors, fire extinguishers, etc.

Figure 6:
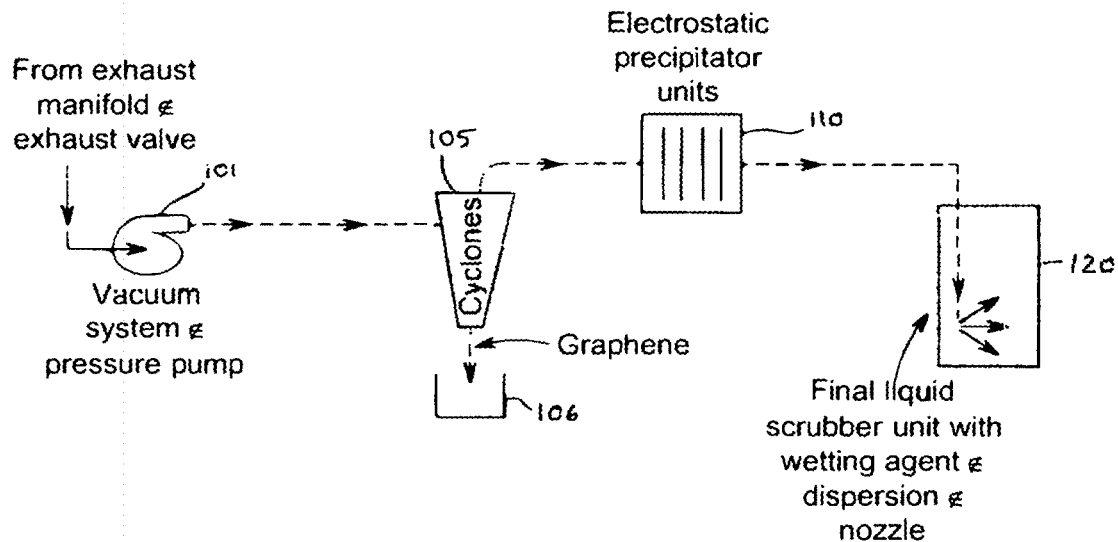
FIG. 6 is a schematic diagram of a system for collecting graphene generated in a modified direct injection diesel engine according to one embodiment of the invention.

FIG. 6 schematically illustrates a collection system for capturing graphene generated in the modified diesel engine according to one embodiment of the invention. The purpose of the collection system is two-fold. First, it ensures that the graphene produced in the engine is collected and available for use. Second, it ensures that potentially hazardous nanoparticles of carbon are not released into the atmosphere and the immediate vicinity. Carbon nanoparticles should never be released into the air because they tall into the same environmental hazards as $PM_{2.5}$, and, if inhaled by human beings, will stay in their lungs for a significant period of time. It is important, therefore, to use a collection system to remove this potential hazard.

The graphene collection system includes a vacuum pump 101 downstream of the engine's exhaust manifold, one or more cyclones 105 and a collection vessel 106, one or more electrostatic precipitator units 110, a liquid scrubbing unit 120 containing a wetting agent, mechanical dispersion nozzle, and associated conduits linking the components together, a power supply, etc. Preferably, multiple cyclones, coupled in series, and multiple electrostatic precipitators are employed to capture substantially all of the carbon particles produced. In actual trials, a single electrostatic precipitator was capable of extracting over 95% of all the downstream particles on one pass, including particles in the nanometer range. Passing the exhaust gas through additional electrostatic precipitators (or multiple passes through one or two precipitators) removes additional particles.

Figure 7:
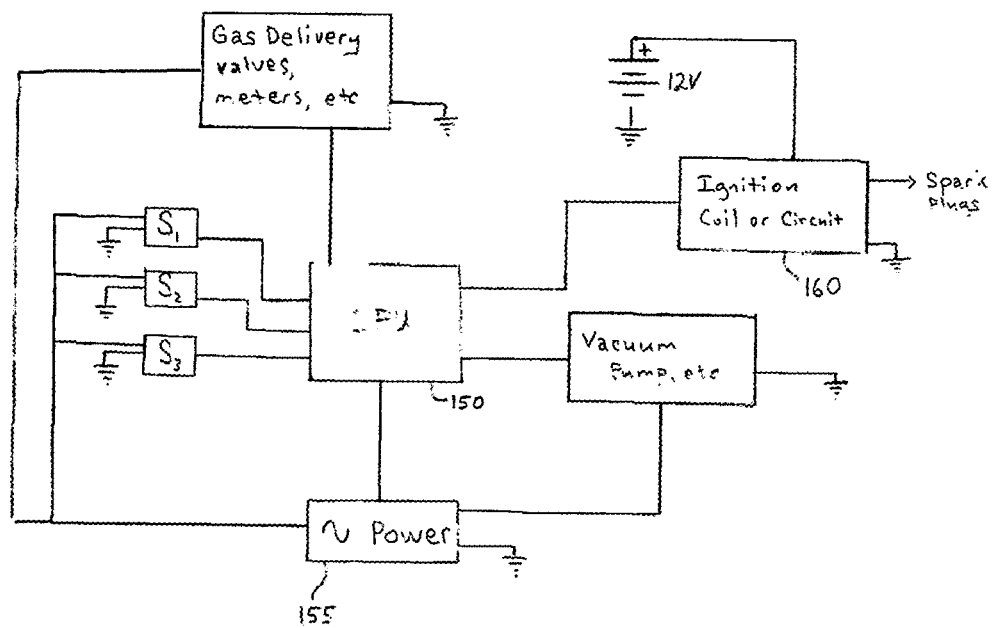
FIG. 7 is a schematic diagram showing power and signal connections between various components of an apparatus for generating graphene according to one embodiment of the invention.

System operation is maintained using a central processing unit, such as a microprocessor, laptop, or other computer, with various electrical components connected to receive commands from and/or send input to the CPU. FIG. 7 schematically illustrates one embodiment for linking the components together electronically. An AC power supply 155 feeds current to the servo motors $S_1$, $S_2$, $S_3$, etc. (which drive the camshafts, crankshaft, etc.), and to the electronic valves and flow meters in the acetylene/oxygen delivery system, the vacuum pump, and other powered components of the collection system, etc. An ignition coil 160 connected to a 12V battery powers the spark plugs (inductive ignition); alternatively, a capacitive discharge ignition system can be used to energize the spark plugs. The CPU is connected to a human interface (keyboard, mouse, monitor, etc.) and can be programmed and operated to execute overall control and monitoring of all components. All components are electrically grounded. Other components (e.g., switches, fuses, relays, electrical meters, indicator LEDs, etc.) may be employed as appropriate.

In another aspect of the invention, a method of producing graphene using a modified direct injection diesel engine is provided. Referring to FIG. 4, with the intake valve 50 open and the exhaust valve 60 closed, the piston 11 is lowered to bottom dead center of the cylinder 15 and a mixture of oxygen and acetylene is supplied from the feed system at under 15 psi pressure (one atmosphere) through the intake port 45. The cylinder is filled with the oxygen and acetylene at a predetermined molar ratio (e.g., 0.4:1 to 0.8:1 oxygen: acetylene) and the intake valve is then closed. A command signal from the CPU then causes the spark plug to be energized, causing the oxygen and acetylene mixture to detonate. Detonation occurs in a very short time interval, in the neighborhood of 5 to 30 milliseconds, with a temperature surge exceeding 3,500° C., and converts the carbon in the acetylene to graphene. After a predetermined cooling period, the exhaust valve 60 is then opened, a servo motor is activated, and the piston is raised to its top dead center position, effectively dispelling all the graphene and gases downstream through the exhaust valve. A command signal from the CPU activates the vacuum pump, which hastens the removal of gases from the detonation chamber. The exhaust valve is then closed, the intake valve opened, and the process can be repeated. In one embodiment, one may operate the engine in this way at a rate of approximately 1 detonation every 2 minutes, vastly slower than the ordinary firing rate at which a diesel engine typically operates.

Both the camshaft and the crankshaft can operated by a computer, which can operate the intake valve and exhaust valve by actuating the camshaft servo motor(s). The servo motor connected to the crankshaft can also be actuated by the computer and controls the piston(s) automatically in its correct sequence. In this case, after detonation and after a cooling period, the exhaust valve will be opened by the computer, and the servo motor connected to the crankshaft will be activated, causing the piston to move up to top dead center, expelling all of the gas and graphene downstream. The computer also sends an activation command to the vacuum system to power on, to ensure that all of the graphene and exhaust gases are evacuated from the cylinder. Then the computer actuates the correct servo motor, which cause the exhaust valve to close and the intake valve to open. A further signal from the computer activates the gas delivery system, allowing oxygen and acetylene to re-enter the chamber while the computer actuates the servo motor to the crankshaft, lowering the piston to the bottom dead center position. The intake valve is then closed, and the engine is ready for the next detonation. An engine having multiple pistons can be operated in a similar way, with signals from the CPU causing the valves to open and close, and the pistons to move, in the proper sequence and interval.

Figure 8:
FIG. 8 is a photograph of graphene particulate material produced according to one embodiment of the invention.

FIG. 8 is a picture of actual graphene produced by the present invention.

The system can be controlled by a computer and automated to serve the needs of industry and research for large quantities of high quality graphene. One can vary the operating parameters—oxygen-to-acetylene ratio, pre-detonation pressure and temperature, etc.—to gauge how the parameters affect the production of graphene (and potentially other carbon species).

It is evident that a diesel engine modified as described herein can produce many detonations per hour per cylinder, resulting in a highly profitable manufacturing apparatus. However, there is one more important detail to be considered when processing at a high rate of detonations per hour. In practice, a spark plug exposed to continuous bombardment by carbon species tends to be fouled quite easily and must be cleaned to avoid misfires between detonations. The divot 15 in the top surface of the modified piston 11 and the slight protrusion of the tip of the spark plug into the detonation chamber impart a self-cleaning effect to the apparatus, thereby substantially reducing—or possibly even eliminating—such fouling. When an acetylene/oxygen mixture is detonated in the detonation chamber and the exhaust valve is opened, there is a swirling rush of gas that escapes through the exhaust valve. This rush of gases is further enhanced by the piston's upward motion from bottom dead center to top dead center by pushing all the gases and graphene out of the detonation chamber through the exhaust valve. The gases pass the spark plug gap, the tip of which protrudes into the detonation opposite the divot. The result is enhanced cleaning and reduced fouling of the spark plug. It is possible that further experimentation will show that the piston(s) do not have to be actuated after each detonation. It is also possible that several detonations can take place before the piston is raised up to the uppermost position to extract the gas and graphene.

One can also explore the spontaneous detonation of acetylene with no oxygen when exposed to pressures approaching two atmospheres and beyond. For example, with the exhaust valve closed and the piston at bottom dead center, one can fill the cylinder with pure acetylene at a pressure of 1 atmosphere. The intake valve is then closed, and the piston raised ½ the distance of its compression stroke. This raises the pressure of the gas to 2 atmospheres—approaching spontaneous detonation without energizing the spark plug. If the piston is raised still further, eventually the acetylene will reach its detonation point and explode, decomposing into graphene and possibly other allotropes of carbon.

Upon reading this disclosure, other embodiments and modifications will be apparent to the skilled person. For example, there are many types of diesel engines, including 1-cylinder, 2-cylinder, inline 4, v6, v8, etc., with many design variations. Any of these diesel engines can be modified as described herein and used as an apparatus for generating graphene. The diesel engine can be further modified by connecting its cooling system to either a cooling tower or a refrigeration system, or any other system to either cool or heat the diesel engine jacket water so that the detonation chamber is maintained at a predetermined level which can also be controlled by a computer to ensure repeatable results. These and other variations, embodiments, and modifications fall within the scope of the present invention, which is limited only by the appended claims and equivalents thereof.

What is claimed is:

1. An apparatus for making graphene, comprising:
   a direct injection diesel engine comprising an engine block, one or more cylinders bored in the block, with a separate piston slidably engaged in each cylinder, a cylinder head covering the engine block, an intake port in the cylinder head associated with each of said one or more cylinders, an exhaust port in the cylinder head associated with each of said one or more cylinders, an intake valve associated with each of said intake port, an exhaust valve associated with each of said exhaust port, one or more camshafts coupled to the intake and exhaust valves, and a crankshaft coupled to the piston(s);
   a first servo motor attached to the crankshaft;
   one or more additional servo motors, wherein each of said one or more additional servo motors is attached to a corresponding one of said one or more camshafts;
   a gas delivery system for delivering a mixture of acetylene and oxygen to the engine, coupled to the engine upstream of the intake port(s);
   a collection system for collecting graphene, coupled to the engine downstream of the exhaust port(s); and
   a central processing unit electrically coupled to all of the servo motors, the gas delivery system, and the collection system; and wherein
   the diesel engine has been modified by removing its fuel injectors and replacing each fuel injector with a spark plug.

2. The apparatus of claim 1, wherein the engine has been further modified by flattening a top of each of said piston and providing a divot in an upper surface of each of said piston.

3. The apparatus of claim 2, wherein the cylinder head has a flat undersurface, the spark plug has a tip, and the tip of the spark plug extends beyond the undersurface of the cylinder head toward and in close proximity to the divot in the upper surface of the piston.

4. The apparatus of claim 1, wherein the gas delivery system includes at least one one-way safety check valve and flame suppressor.

5. The apparatus of claim 1, wherein the graphene collection system includes a vacuum pump, at least one cyclone, and at least one electrostatic precipitator.

6. The apparatus of claim 1, wherein the central processing unit is a computer.

7. A method for making graphene in a modified diesel engine, comprising:
   feeding a mixture of acetylene and oxygen into a modified direct injection diesel engine, wherein the diesel engine comprises an engine block, one or more cylinders bored in the block, with a separate piston slidably engaged in each of said one or more cylinders, a cylinder head covering the engine block, an intake port in the cylinder head associated with each of said one or more cylinders, an exhaust port in the cylinder head associated with each of said one or more cylinders, an intake valve associated with each of said intake ports, an exhaust valve associated with each of said exhaust ports, one or more camshafts coupled to the intake and exhaust valves, and a crankshaft coupled to the piston(s), and wherein the diesel engine has been modified by removing its fuel injectors and replacing each fuel injector with a spark plug;
   detonating the mixture of acetylene and oxygen by energizing the spark plug, thereby forming graphene; and
   collecting the graphene by venting exhaust from the detonation into a graphene collection system.

8. The method of claim 7, wherein the engine has been further modified by flattening a top of each of said piston and providing a divot in an upper surface of each of said piston.

9. The method of claim 8, wherein the cylinder head has a flat undersurface, each spark plug has a tip, and the tip of each spark plug extends beyond the undersurface of the cylinder head toward and in close proximity to the divot in the upper surface of a corresponding one of said piston(s).

10. The method of claim 7, wherein the gas delivery system includes at least one one-way safety check valve and flame suppressor.

11. The method of claim 7, wherein the graphene collection system includes a vacuum pump, at least one cyclone, and at least one electrostatic precipitator.

12. The method of claim 7, wherein the diesel engine includes a separate servo motor attached to a corresponding one of each of the one or more camshafts and electrically coupled to a central processing unit, and wherein each servo motor attached to the one or more camshafts causes intake and exhaust valves to open or close in response to a command signal from the central processing unit.

13. The method of claim 7, wherein the modified diesel engine includes a servo motor attached to the crankshaft and electrically coupled to a central processing unit, and wherein the servo motor attached to the crankshaft causes the piston(s) to move in response to a command signal from the central processing unit.

* * * * *